United States Patent [19]

Blackledge

[11] Patent Number: 4,901,468

[45] Date of Patent: Feb. 20, 1990

[54] BUOYANT FISHING DEVICE AND METHOD OF USING SAME

[76] Inventor: Herman Blackledge, 322 Park Ave., East Peoria, Ill. 61611

[21] Appl. No.: 367,426

[22] Filed: Jun. 16, 1989

[51] Int. Cl.$^4$ .............................................. A01K 93/00
[52] U.S. Cl. ........................................................ 43/17
[58] Field of Search .......................... 43/15, 16, 17, 44.9

[56] References Cited

U.S. PATENT DOCUMENTS

| | | | |
|---|---|---|---|
| 4,246,716 | 1/1981 | Elmer | 43/17 |
| 4,310,983 | 1/1982 | Irvin et al. | 43/17 |
| 4,809,456 | 3/1989 | Caparelli et al. | 43/17 |

*Primary Examiner*—M. Jordan

*Attorney, Agent, or Firm*—Bernard L. Kleinke; William Patrick Waters; Jerry R. Potts

[57] ABSTRACT

The fishing device has a large buoyant base and an openable compartment which is mounted on top of the base to ride above the water line to help protect an electrical signalling mechanism within the compartment. A cover assembly is removably mounted over the compartment, and can be moved manually to an opened position to permit access to the signalling mechanism. A large handle on the cover permits either the cover to be opened, or enables the entire device to be removed quickly and efficiently from the water to retrieve a fish. The handle can also be used to attach the device to other similar devices. The signalling mechanism emits a light signal, which is visible at night for night fishing.

9 Claims, 1 Drawing Sheet

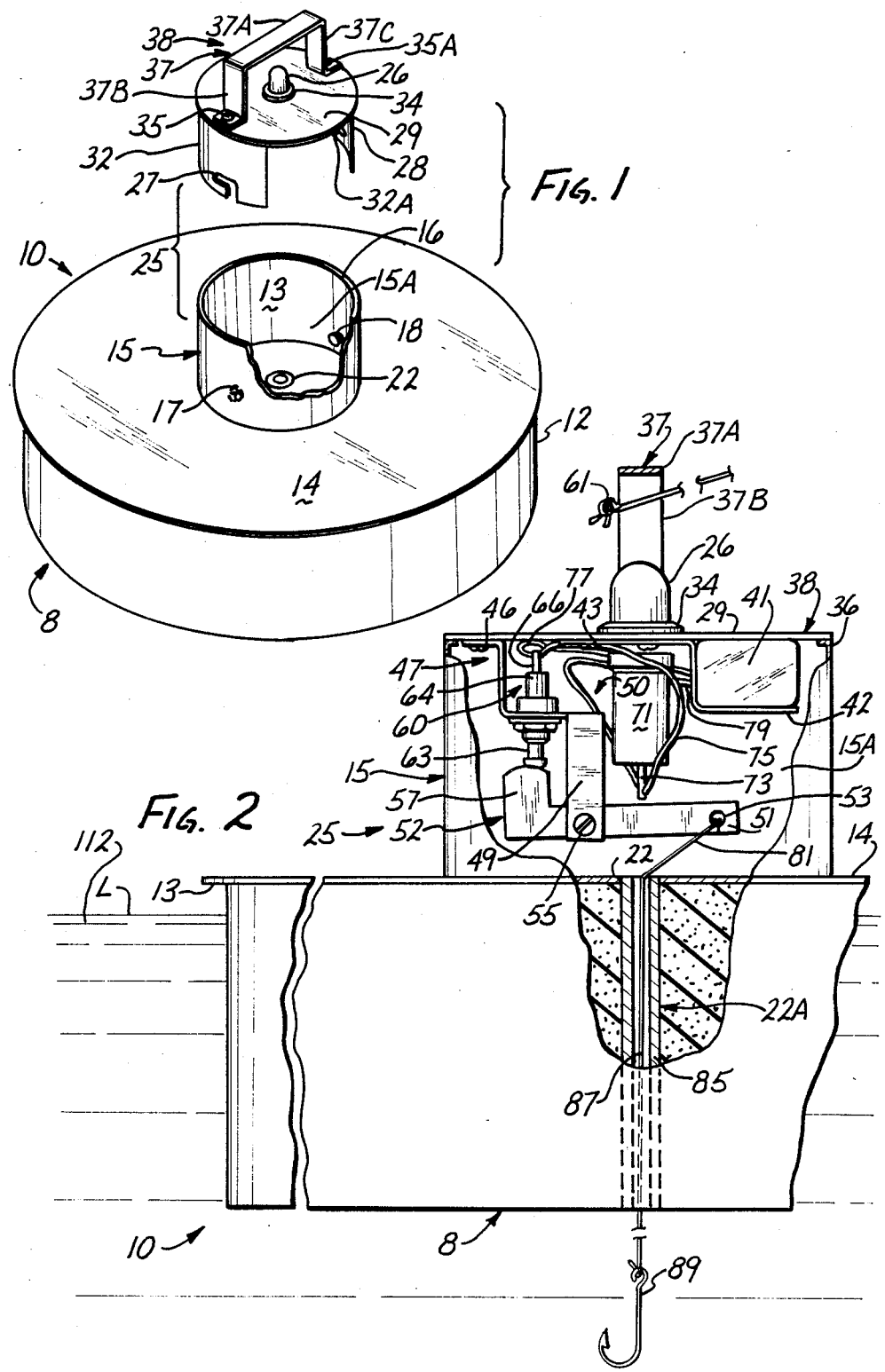

BUOYANT FISHING DEVICE AND METHOD OF USING SAME

DESCRIPTION

1. Technical Field

The present invention relates, in general, to a buoyant fishing device and the method of using it, and it more particularly relates to such a fishing device and method for use at night.

2. Background Art

Fishing devices of the present invention relate are commonly utilized in endeavors such as jug fishing, trot line fishing, still fishing, float fishing, and the like. In these applications, one or more fishing devices are placed in the water. Each device has a fishing line, or leader, of a desired length, which has a hook on one end and is attached at its other end to a signalling apparatus of the fishing device. In the usual application, tension on the fishing line, caused by a hooked fish, triggers a signalling mechanism so that it can be determined that a fish has been caught.

In this regard, after the signalling device is activated, the device itself may be removed from the water, thereby also pulling the fish out of the water. After the fish has been removed from the hook, the fishing device may be reset and placed back in the water in the expectation of hooking yet another fish.

Fishing devices, as described, are of significant utility since they enable an individual to operate, simultaneously, a number of fishing lines and, in addition, enable the individual to remove from the water only the lines which have been activated by the presence of a fish on the hook. This factor allows, for example, an individual to erect a trot line across a body of water having a number of fishing devices attached thereto.

Because the individual's capacity is magnified by the use of fishing devices, such devices have significant commercial value, in addition to their value to the individual who fishes for sport.

In general, the signal emitted by the commonly-known fishing device is one that must be detectable at some distance from the device. In this regard, electrical noise making fishing bobbers and fishing alarm devices are known. For example, reference may be made to U.S. Pat. Nos. 2,922,243 and 4,748,760.

While devices which emit an audible signal may be satisfactory for some applications, such a device is inherently limited under what conditions it may be used. For example, a sound emitting device is of limited value since it may be difficult to locate the source of the sound. This is the case, because the sound signal radiates in all directions and, i addition, reflects off of the surface of the water. This is an even more significant problem at night.

Limitations in sound emitting devices are seen, for example, when multiple devices are being utilized over a limited area of water. Under these circumstances, it is difficult, and sometimes virtually impossible, to identify which one of a number of similar devices has been activated and is emitting the sound signal.

Further, sound emitting devices are limited since the sound itself must often compete with ambient noise, produced by boat engines and the like. Thus, while sound emitting devices are known, they have serious deficiencies and, as a result, are limited in their utility. In this regard, it would be very desirable to have a buoyant fishing device which would reliably function at night, and/or in a noisy environment, and which, in addition, could be readily identified as the activated device when it is employed with other similar devices.

In an effort to overcome the deficiencies of sound emitting devices, fishing devices have been developed in which a light bulb is illuminated when the fish grasps the fish hook. While light emitting devices avoid some of the difficulties presented by those which emit sound, both the prior art sound emitting and the light emitting devices have certain other serious deficiencies in common.

The corrosive effects of water on electrical circuitry and metal parts are well known. Some devices (see for example U.S. Pat. No. 2,901,855) have the signal generating elements in an exposed condition. As a result, rust and corrosion can quickly render them useless. In other devices, only limited protection from water is provided because the signal generating elements are enclosed within a buoyant container. In this regard, reference may be made to U.S. Pat. Nos. 2,798,330; 3,739,513 and 4,748,760. The buoyant containers float in the water, and, because their signal generating elements are located within the container, the elements, or portions thereof, are often at, or very near, water level.

In buoyant devices of this type, during a fishing operation, the container can be damaged, thereby permitting water to enter the interior and thus damaging the mechanisms therein. This factor necessitates the maintaining of water tight integrity of the device. However, in order to provide the necessary water tight integrity, it very difficult, in use, for a person to open such a device to gain access to its internal mechanism for attaching the fishing line thereto, and for repair or replacement of parts such as a light bulb or a battery.

Therefore, it would be highly desirable to have a buoyant fishing device, which could emit an attention attracting signal to alert the user to the fact that a fish is taking the bait, and which can be used effectively at night. Additionally, such a device should provide adequate protection from water damage, and yet be readily accessible for attaching it to a fishing line and for the repair or replacement of internal working parts.

In addition to the above-mentioned deficiencies in prior art fishing devices, such devices are not readily able to be connected to other such devices, to enable the simultaneous utilization, in a convenient manner, of a number of similar buoyant fishing devices. In addition, known buoyant fishing devices readily removable from the water, in a fast and convenient manner, at the time when the user wishes to remove a fish from the hook.

Therefore, it would be highly desirable to have a buoyant fishing device, which avoids the limitations of sound emitting devices and which protects the interior mechanism from water damage, while being easily disassembled to provide access to its interior elements. Such a device should be readily attached to similar fishing devices, and can be quickly and easily removed from the water for the purpose of retrieving a fish.

DISCLOSURE OF INVENTION

It is the principal object of this invention to provide a new and improved buoyant fishing device and method of using it, wherein its internal components are readily accessible under field conditions, and yet are protected against water damage.

It is a still further object of the present invention to provide such a buoyant fishing device and method of using it wherein it is readily connectable to other such fishing devices, and can be retrieved quickly and conveniently from the water.

Briefly, the above and further objects of the present invention are realized by providing a buoyant fishing device, which protects its internal components from water damage, and which can be readily opened to connect the fishing line to the internal components. The fishing device has a large buoyant base and an openable compartment which is mounted on top of the base to ride above the water line to help protect an electrical signalling mechanism within the compartment. A cover assembly is removably mounted over the compartment, and can be moved manually to an opened position to permit access to the signalling mechanism. A large handle on the cover permits either the cover to be opened, or enables the entire device to be removed quickly and efficiently from the water to retrieve a fish. The handle can also be used to attach the device to other similar devices. The signalling mechanism emits a light signal, which is visible at night for night fishing.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 1 is an exploded, pictorial fragmentary view of a buoyant fishing device, which is constructed according to the present invention; and FIG. 2 is an enlarged, fragmentary elevational view of the device of FIG. 1, with portions cut away for illustration purposes.

BEST MODE FOR CARRYING OUT THE INVENTION

Referring now to the drawings, and more particularly to FIG. 1 thereof, there is shown a buoyant fishing device 10, which is constructed in accordance with the present invention. The device 10 is adapted to be attached to a fishing line 81 (FIG. 2), having a fish hook 89 tied to its bottom end for facilitating the catching of fish (not shown) in the water 112.

The fishing device 10 generally comprises a buoyant circular base 8 for supporting the device 10 in the water 112. A compartment assembly 25 located on top of base 8 contains an electrical signaling circuit 50 for illuminating a light bulb 26 on top of the compartment assembly 25. As best seen in FIG. 2, the compartment 25 rides on top of the base 8 in the water 112, to help protect the circuit 50 from water damage. A cover assembly 38 cooperates with an upstanding opened top hollow tubular housing 15 having a hollow interior 15A for receiving the circuit 50 mounted to the underside of the cover assembly 38, which attaches releasably to the housing 15, as shown in FIG. 2. A handle 37 is fixed to the cover assembly 38 to facilitate the quick removal of the device 10 from the water 112. The handle 37 also is used to separate the cover assembly 38 from the housing 15 to gain access to the interior 15A of the compartment assembly 25. Additionally, like devices (not shown) can be attached together by connection to the handle 37.

In order to provide buoyancy for the device 10 the base 8 includes a float 12, which has a circular base cap or wall 14, supporting from below the compartment assembly 25. A centrally disposed aperture 22 in the cap 14 in axially aligned with a bore or opening generally indicated at 22A of FIG. 2, to permit passage of a fishing line 81 therethrough.

The cover assembly 38 of the compartment assembly 25 includes a top wall 29 and a pair of depending arcuate side walls 32 and 32a. The side walls 32 and 32a are spaced apart radially and are curvilinearly shaped so as to enable them to fit in a tight manner telescopically within the housing 15. The lamp 26 projects upwardly from the top wall 29, to provide the visual attention-attracting signal to the user at appropriate times.

As shown in FIG. 2, the electrical circuit 50 includes a power source, such as a battery 41, which is electrically connectable to the lamp 26 through a normally opened switch 60. A pivotally mounted actuating arm or lever 51 has one end fixed to the line 81, and its opposite end engaging the switch 60 to close it electrically when a fish pulls on the line 81.

In operation, the user generally begins with the cover assembly 38 of the compartment assembly 25 separated from the housing 15 fixed to the base 8. The fishing line 81 of a predetermined length, having a hook 89 tied at its lower end, has its pole end inserted through a bore in the base 8, and through the open bottomed compartment 25. It is then attached to the activating arm 51 in the compartment 25. After the hook 89 is baited and after attachment of the fishing line to the activating arm, the compartment 25 is inserted, and latched to the base 8. The fishing device is then placed in the water for the purpose of attracting fish to the baited hook. The fishing device 10 may be left floating singly in the water, or it may be connected to a multiplicity of similar or like devices, or to a boat or pier.

After a fish has grasped the baited hook, the effort on the part of the fish to regain its freedom causes tension in the fishing line which, in turn, moves the activating arm 51 pivotally in a clockwise manner as viewed in FIG. 2, to cause, in turn, the switch 60 to close electrically for energizing the lamp 26 for illuminating it.

When the lamp is illuminated, the fishing device may be removed manually from the water by its handle 37, and the fish removed from the hook 89. After the hook 89 is again baited, the device 10 is lowered back into the water in the expectation of catching a second fish. There is no need to reset any mechanism within the device 10, because, as more fully hereinafter discussed, the electrical circuit 50 is normally opened. It is closed only when tension is placed on the fishing line, and the switch 60 resets itself automatically. Removal of the fish from the line relieves the tension on the line so that the circuit is restored to its normally de-energized condition with the lamp 26 being extinguished.

Considering now the base 8 in greater detail with reference to FIGS. 1 and 2, the base 8 includes the float 12, which is between two and four inches thick, and between 10 and 18 inches in diameter The float 12 is in the form of a cylindrical block, and is constructed of a suitable buoyant material, such as cork, polyurethane or other suitable material having positive buoyant characteristics. The material is sufficiently buoyant to support the device 10 in the water 112 with the compartment assembly 25 disposed substantially above the water line L, as shown in FIG. 2. The float 12 is fixed by any suitable technique, such as being cemented to the underside of the cap 14. Since the float 12 has a diameter which is slightly less than the diameter of the cap 14, an annular lip 13 (FIG. 2) is provided where the cap 14 overhangs or extends radially beyond the float 12. The lip 13 limits splashing of water up onto the top of the base 8 and into the compartment assembly. While the float 12 is the preferred form of the invention, it will be understood that the base 8 could be hollow, having watertight characteristics and of a unitary metal or plastic construction, thereby providing sufficient buoyancy for enabling the device to float in the water.

The housing 15 is connected to the top of the cap 14, and is cylindrical in shape. It is fixedly attached, in a leak tight manner, to the central portion of the cap 14. In this regard, the bottom edge of the housing 15 may be suitably sealed to the upper surface of the cap 14, to prevent or at least inhibit water from flowing into the interior 15A and possibly damaging the circuit 50.

The housing 15 and the cap 14 may be constructed of thin, light weight metal, such as aluminum, or they may be constructed of any suitable plastic material. In one form of the invention, the housing 15 and the cap 14 are composed of unitary molded plastic construction, thereby insuring watertight integrity between the housing 15 and the cap 14. An aperture 22 is located in the center of the cap 14, and is axially disposed in relationship to the housing 15. The aperture 22 communicates with and is aligned with the top end edge of a protective tube 85 having a bore or opening 87, which extends downwardly from the aperture 22 in the top plate 14 through the float 12, for the passage therethrough of the fishing line 81 therewithin. The tube 85 serves as a smooth bearing surface to reduce friction on the fishing line 81 as the fishing line is moved through the base 8.

The interior 15A of the compartment assembly 25, as best seen in FIG. 2, is defined by the housing 15, the cap 14 and the cover assembly 38. The diameter of the housing 15 is slightly larger than the diameter described by the side walls 32 and 32a of the compartment assembly 25, so to provide a snug frictional telescoping fit for the cover assembly 38 of the compartment assembly 25 within the housing 15.

Locking means are desirable for fixing securely the compartment 25 within the sleeve 15 to prevent accidental separation of the two. While a number of suitable locking means may be utilized, as FIG. 1, there is shown a pair of inwardly projecting, spaced apart, studs 17 and 18 on the respective inner surface 13 (FIG. 2) of the housing 15. The studs 17 and 18 are positioned to fit into and to engage the respective bayonet slots 27 and 28 in the bottom edges of the respective walls 32 and 32A, so that when the cover assembly 38 is placed into the housing 15, slight rotation of the assembly 38 in relation to the housing 15 results in studs 17 and 18 being securely held, respectively within a horizontal portion of the slots 27 and 28, thereby securely holding the compartment assembly 25 in place.

Under field conditions, the assembly cover of the compartment assembly 25 can be readily separated from the sleeve 15 by an appropriate rotation and upward pull of the compartment 25. Thus, replacement of the battery 41 or of the lamp 26 can be easily accomplished in this field.

A circumferential O-ring 36, constructed of resilient material is located under the top 29 of the cover assembly 38, so that when it is latched into the housing 15, the O-ring 36 is compressed between the bottom portion of the top 29 and a top rim 16 of the housing 15, thereby providing a watertight seal to protect the contents of the interior 15A.

Due to the buoyancy of the float 12, the water sensitive portions of the present invention, as depicted in FIG. 2, float above the water level 112. Since the bore 87 is open to the water, water rises in the bore but, in general, will not rise higher than the water level 112. If, under adverse water conditions, where, in the presence of waves or choppy water, the present invention tips and bobs in the water, some small volume of water may temporarily rise in the bore 85, enter the housing 15 through the aperture 22. Since the diameter of the bore is approximately ¼ inch, even under severe conditions, very little water reaches the housing interior 15A. However, even in the event water so enters, the utility of the present invention would not be impaired, because the sensitive electrical portions thereof are located sufficiently high in the compartment interior 15A so as to remain dry under adverse water conditions. Also, any water entering the interior 15A, then quickly drains out through the aperture 22 and the tube 85 via its bore 87.

Considering now the compartment assembly 25 in greater detail, it has a centrally apertured circular top 29, for supporting the upwardly projecting lamp 26. A resilient seal 34 is interposed between the lamp 26 and the aperture of the top 29, to hold the lamp 26 snugly in place in a water tight manner. The U-shaped handle 37 is fixed to the upper surface of the top 29 by attachment means such as by a pair of bolts 35 and 35A. The handle 37 enables one to transport the device conveniently and to remove the device easily from the water after a fish has been caught. In addition, the device can be attached by line, such as a line 61 (FIG. 2) to one or more other similar or like devices. Further, the handle 37 can be utilized for locating a multiplicity of devices at preselected intervals along a trot line.

The handle 37 has a bight portion 37A, and a pair of integrally connected depending leg portions 37B and 37C, each having bent end portions fastened by the bolts 35 and 35A to the top 29. A multiplicity of devices may be utilized by attaching them, for example, to a trot line. Attachment is readily accomplished by securing one end of a line 61 to a portion of the handle 37 while fixing the other end of the line 61 to the trot line.

Considering now the electrical circuit means 50, it includes a battery 41, a lamp base socket 71 and the switch 60 connected electrically in series. A conventional, 9 volt, dry cell battery has been found to be a suitable power source in the present invention.

A wire lead 79 is disposed between the battery 41 and a base socket 71 for connecting the battery electrically to the base socket. A wire lead 75, in turn, connects electrically the base socket 71 at base socket terminal 73 to the switch 60 at a switch terminal 66. In order to complete the electrical circuit, a wire lead 77 is disposed between the switch terminal 66 and the battery 41.

The switch 60 is normally opened with no electrical current flowing through the electrical circuit 50. Movement of a plunger 63 within a switch body 64, closes the electrical circuit, causing current flow to illuminate the lamp 26.

A switch actuator 52 includes the elongated pivotally mounted lever or arm 51 and an upturned end 57. The upturned end 57 is disposed in direct contact with the plunger 63 to move the plunger 63 into the switch body 64. The actuating arm 51 is pivotally fixed at a pivot point 55 disposed intermediate the ends of the arm, closer to the upturned end. At the end of the actuating arm 51, opposite the end 57, an aperture or hole 53 is located therein for receiving the fishing line 81. Tension on the fishing line 81, such as caused by a fish on the hook 89, moves the actuating arm 51 clockwise about the pivot 55, to move the upturned end upwardly to move the plunger 63. Thus, the plunger 63 is moved into the socket body 64, thereby closing the electrical circuit.

The battery 41 is held in place by a battery support means 42 which is fixed by means such as a screw 43, to the top 29 of the compartment 25. The switch 60 and the actuating means 52 are held in place by support means 47 which is attached to the top 29 by fixing means such as a screw 46. The support means 47 has a flange portion 48 which is disposed approximately horizontally relative to the planar surface of the top 29. Depending from the flange portion 48 at approximately a right angle to it, is a pivot support 49 for supporting the pivot 55.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A signalling fishing device for attachment to a fishing line, comprising:
   buoyant base means having an opening for passage of the fishing line therethrough;
   compartment means mounted on top of said base;
   signaling means disposed within said compartment means for generating a visible attention attracting signal when a fish strikes the fishing line;
   switch actuating means connected to the fishing line for causing said signaling means to generate said signal; and
   cover means defining a portion of said compartment means for moving to an opened position to permit access to the interior of said compartment means.

2. A device of claim 1, wherein said cover means includes an aperture communicating with said opening, said cover means further having a sleeve for holding said compartment, said compartment having support means for said power source; support means for said lamp; support means for said switch and activating means.

3. A device of claim 1, wherein said cover means includes means for mounting detachably to said base.

4. A device of claim 1, having means for attaching said compartment to said base in a watertight manner.

5. A device of claim 1, wherein said compartment is locked within said sleeve.

6. A device of claim 5, wherein said sleeve has at least one inwardly projecting stud and said compartment has at least one wall member having an opening therein for registration with said stud.

7. A device of claim 1, wherein said switch activating means is an elongated lever connectable at one end to a fishing line, pivotally attached at a point intermediate its ends to a support means so as to be rotatable about said support means to close an electrical switch when tension is put on said fishing line.

8. A device of claim 1, wherein said top has a handle affixed thereto.

9. A method of detecting the presence of a fish at a fishing line, comprising:
   threading a fishing line through an opening in a buoyant base having a cover with an aperture communicating, said fishing line having a hook at one end and being attached at its other end to a switch activating means in a compartment;
   attaching said compartment to said base;
   placing said base in water so that the hook of said fishing line depends therefrom; and
   observing a visual signal when tension is applied to said fishing line by the fish.

* * * * *

UNITED STATES PATENT AND TRADEMARK OFFICE
CERTIFICATE OF CORRECTION

PATENT NO. : 4,901,468

DATED : February 20, 1990

INVENTOR(S) : Herman Blackledge

It is certified that error appears in the above-identified patent and that said Letters Patent is hereby corrected as shown below:

Column 1, line 53, before "addition", please delete "i" and substitute therefor --in--.

Column 3, line 58, after "as shown in", delete "FIG. 2.A" and substitute therefor --FIG. 2. A".

Column 4, line 56, after "diameter", insert --.--.

Signed and Sealed this

Nineteenth Day of November, 1991

Attest:

HARRY F. MANBECK, JR.

*Attesting Officer*     *Commissioner of Patents and Trademarks*